United States Patent Office 2,718,535
Patented Sept. 20, 1955

2,718,535

HYDROISOMERIZATION OF HYDROCARBONS

Joseph B. McKinley, Pittsburgh, and Robert E. Kline, Penn Township, Allegheny County, Pa., assignors to Gulf Research & Development Company, Pittsburgh, Pa., a corporation of Delaware No Drawing. Application March 18, 1952,
Serial No. 277,305

4 Claims. (Cl. 260—683.5)

This invention relates to the hydroisomerization of hydrocarbons, and more particularly to the catalytic hydroisomerization of normally liquid hydrocarbons boiling in the gasoline or naphtha boiling range.

By the terms "hydroisomerization" and "catalytic hydroisomerization" as used herein and in the appended claims, it should be understood that we mean a process in which a hydrocarbon is subjected to treatment at a temperature in excess of 750° F. in the presence of a catalyst comprising an oxide of a metal of Groups Va, VIa, and VIII of the Periodic Table at a pressure above about 50 pounds per square inch gauge and in the presence of a substantial quantity of hydrogen. Hydroisomerization is one of the attendant reactions occurring during the hydroreforming of hydrocarbons.

Hydroisomerization may be applied to the treatment of hydrocarbons consisting entirely or predominantly of straight chain paraffins such as n-butane, n-pentane, n-hexane, n-heptane, and the like. In this case the straight chain paraffins are converted in a substantial degree to the corresponding branched chain isomers. Hydroisomerization is also usefully applied in converting naphthenes to more valuable isomers such as, for example, by rearranging methylcyclopentane to cyclohexane, a substantial proportion of which is then dehydrogenated to benzene. Advantageous results of hydroisomerization are also obtainable with charge stocks in which the straight chain paraffins or naphthenes are mixed with other hydrocarbons such as a mixture of hydrocarbons boiling in the gasoline or naphtha boiling range. For example, natural or casing-head gasolines, which are usually largely paraffinic in composition, and straight run petroleum naphthas are desirable charge stocks. Naphthas or gasoline fractions which contain a relatively large proportion of saturated hydrocarbons, for example 50 per cent or more, are especially valuable stocks for hydroisomerization.

In accordance with the present process, the hydrocarbon charge is contacted with hydrogen under hydroisomerizing conditions in the presence of a catalyst comprising an oxide of a metal of groups Va, VIa, and VIII of the periodic table, said catalyst having been pretreated by reduction with hydrogen followed by contact of the reduced catalyst with a material which will reoxidize at least the surface of the reduced catalyst metal to a gross state of oxidation intermediate the free catalyst metal and the highest oxide of the metal. For instance, we have found that by reducing molybdenum trioxide with hydrogen and then contacting the reduced catalyst with a substance which will partially reoxidize at least the surface of the catalyst metal substantially to molybdenum dioxide, a catalyst is obtained which when used in the subsequent hydroisomerization of a hydrocarbon, gives an improved yield of branched-chain isomers. The catalyst obtained by the pretreatment described herein is particularly suitable in a hydroisomerization process wherein a small amount of an oxygenic substance is included in the charge to the reaction zone. In such a case, the hydroisomerizing temperature, however, is at least about 850° F. Under these conditions, the desired state of oxidation is maintained over a long period of operation. This process is described in the application Serial Number 277,304 of J. B. McKinley and W. A. Horne filed of even date herewith.

The catalyst used in the hydroisomerization process comprises the oxide of a metal which oxide is at least partially reducible to the free metal and/or lower oxides when treated at a temperature in excess of about 750° F. with hydrogen. Metal oxides of this type are found in groups Va, VIa, and VIII of the periodic table. The more important hydroisomerization catalysts within this group are the oxides of the metals molybdenum, tungsten, cobalt, and nickel. The preferred catalyst in accordance with the process herein defined is the specially prepared oxide of molybdenum. While the molybdenum oxide can be used alone, we prefer to employ it in combination with a suitable support such as activated alumina, alumina gels, silica gels, silica-alumina gels, aged sicila-alumina cracking catalysts, silica-magnesia gels, magnesia, titania, bauxite, kieselguhr, and the like. A particularly suitable support comprises an activated alumina containing a relatively small amount of silica. For example, about 5 per cent by weight of silica gives an excellent catalyst support insofar as improved surface characteristics are concerned. Ordinarily, the molybdenum oxide, calculated as $MoO_3$, constitutes about 8 to 12 per cent by weight of the finished catalyst.

Hydroisomerization using a catalyst pretreated in accordance with the invention can be carried out at a temperature in excess of 750° F., the preferred range being 850° to 1100° F. The pressure employed is at least about 50 pounds per square inch, the preferred range being about 100 to 2,000 pounds per square inch. When pressures are mentioned herein and in the appended claims, gauge pressures are intended. During the hydroisomerization reaction the ratio of hydrogen to hydrocarbon comprises about 50 to 30,000 standard cubic feet of hydrogen per barrel of hydrocarbon charge and preferably about 1,000 to about 20,000 standard cubic feet of hydrogen per barrel of hydrocarbon. Initially in the process it may be necessary to supply hydrogen from an extraneous source, but since the reactions occurring during the reaction period are generally neither hydrogen consuming nor hydrogen productive, as the reactions proceed, the hydrogen requirements can usually be met predominantly or entirely by recycle of hydrogen from the product. Hydroisomerization is ordinarily carried out at a space velocity of about 0.25 to 10 volumes of charge per volume of catalyst per hour (based on packed catalyst volume). Generally a space velocity of about one-half to three vol./vol./hr. is preferred.

The operating cycle for the over-all hydroisomerizing process herein defined ordinarily comprises (1) reducing molybdenum trioxide with hydrogen, (2) contacting the reduced catalyst with an oxidizing substance, (3) the reaction period, (4) purging the catalyst, and (5) regenerating the catalyst by burning off the carbonaceous deposit formed during the reaction period.

Reduction of the hydroisomerizing catalyst is ordinarily accomplished by treating the catalyst with hydrogen at an elevated temperature but below that temperature at which sintering of the catalyst occurs. Reduction is best carried out at a temperature in excess of 750° F. and preferably at a temperature of about 1000° to about 1100° F. The pressure employed during the reduction of the catalyst is usually from atmospheric pressure to the pressure at which the hydroisomerizing process is carried out, although lower and higher pressures can be used. We have found that good results are obtained by initially contacting the catalyst with hydrogen at atmospheric pressure and then increasing the pressure to that employed in hydroisomerizing while further reducing the catalyst with hydrogen. We advantageously contact the molybdenum trioxide with hydrogen until substantially all of the trioxide has been reduced to at least the dioxide and advantageously reduced to such an extent that the gross state of oxidation is intermediate the free metal molybdenum and molybdenum dioxide. Reduction of molybdenum trioxide to the desired state may require between about 1 and about 6 hours when a temperature of about 1050° F. is employed.

The reduction of the catalyst can be carried out either in a fixed bed or in a "fluid" type system. The particular system employed for pretreating the catalyst is usually, but not necessarily, dependent upon the type of operation used in the hydroisomerizing process. Reduction is advantageously carried out with substantially pure hydrogen or with hydrogen which contains less than about 0.05 per cent of oxygen or equivalent amount of another oxygenic substance. In certain instances reduction of the catalyst is advantageously carried out with a portion of the hydrogen which is ordinarily recycled to the hydroisomerization reaction zone.

Reoxidation of the reduced catalyst is an essential step in the over-all process. If the reduced catalyst is not reoxidized to the desired state of oxidation, the catalyst is not substantially better and in many instances worse than catalyst which has only been pretreated with air as in oxidative regeneration. However, when the reduced catalyst is contacted with an oxidizing substance or a material which is capable of supplying oxygen to the reduced catalyst in contact therewith at a temperature of about 750° to about 1100° F., a superior catalyst is obtained. Reoxidation is continued for a time sufficient to convert at least the surface of the catalyst metal to a higher state of oxidation intermediate the free catalyst metal and the highest oxide of the metal. Oxidation of the reduced catalyst may be carried out at atmospheric subatmospheric, or superatmospheric pressures.

The reoxidation of the reduced catalyst can be carried out either in a fixed bed or in a "fluid" type system. If a fixed bed is employed it may be alternatively subjected to the contacting steps of the operating cycle mentioned above. However, pretreating may be accomplished in separate chambers or zones, the pretreated catalyst then being returned to the hydroisomerization zone. The particular system employed for reoxidizing the catalyst is usually, but not necessarily, dependent upon the type of operation employed in the hydroisomerizing process. Reoxidation is accomplished by treating the reduced catalyst with an oxygenic substance.

The term "oxygenic substance" is employed in its usual sense to mean oxygen as well as oxygen-containing compounds. These oxygenic substances should be capable of oxidizing the reduced catalyst to a desired state of oxidation without having any detrimental effect on its hydroisomerizing activity. The substances which we can use include: oxygen; inorganic oxygenic substances such as steam and the oxides of carbon and nitrogen; nitrogen containing a small amount of oxygen; organic oxygenic substances such as certain alcohols, including methyl alcohol, ethyl alcohol, and the like; aldehydes, including formaldehyde, acetaldehyde, and the like; organic acids, including acetic, propionic, butyric, and the like; preoxidized hydrocarbon charge; and various oxygen-containing solids, for example, the catalyst containing the metal in a higher state of oxidation than is maintained in the hydroisomerization reaction zone. In certain instances, as for example when an aldehyde or an acid is employed for reoxidation of the catalyst, it is also desirable to introduce hydrogen into the system to avoid possible deposition of carbonaceous deposits on the catalyst. Obviously only such oxygenic substances should be used as have no detrimental effect on the catalyst. Thus, it would ordinarily be undesirable to use sulfur-containing oxygenic substances such as the oxides of sulfur, sulfuric acid, sulfonic acids, or the like, because of the poisoning effect of sulfur on the catalyst. Examples of the preferred oxygenic substances are free oxygen, steam, and carbon dioxide. Reduction of the catalyst with hydrogen followed by reoxidation with one of these preferred oxygenic substances does not reduce the surface area of the catalyst support.

The method of introducing the oxygenic substance during the reoxidation of the reduced catalyst depends in part upon the particular oxygenic substance used. When oxygen or steam is used, it is ordinarily advantageous to introduce the substance, in the case of fixed bed operation, at a plurality of points so as to achieve uniform treatment of the entire bed. If a fluid system is employed, the oxygen or steam is preferably introduced in the lower portion of the bed. In a moving bed system the oxygenating gas is preferably passed through the catalyst countercurrent to the flow of catalyst.

We have found that when molybdenum trioxide has been reduced and then subsequently reoxidized in accordance with the above procedure, higher hydroisomerizing reaction temperatures can be employed than are ordinarily used when the catalyst has been reduced but not reoxidized. We have found that at any given yield, a temperature in the order of 25° to 200° F. higher than would ordinarily be used can be employed and that the octane number of the product so obtained is about 10 to about 20 numbers higher than the product obtained when the hydrocarbon charge is hydroisomerized with a catalyst which has been reduced but not subjected to reoxidation. We have further found that at a given octane number, the reoxidized catalyst gives greater yields of product than otherwise can be obtained when using a catalyst which has been reduced but not reoxidized.

When the hydroisomerizing process is first started up, we advantageously reduce the fresh calcined catalyst with hydrogen and then partially reoxidize the catalyst according to the procedure set forth hereinabove. After the process is "on-stream," make-up catalyst is advantageously added to the use catalyst just prior to the reduction step. In some instances we prefer to recalcine the fresh catalyst in air at a temperature in excess of the temperature employed in the hydroisomerizing reaction but below the sintering temperature of the catalyst. This removes impurities.

Following the oxidation of the reduced catalyst, the catalyst is then ready to be contacted with the hydrocarbon charge in the presence of hydrogen under the hydroisomerizing conditions outlined above.

Hydroisomerizing can be carried out with the catalyst deposited in a stationary fixed bed, in which case the catalyst is usually employed in the form of granules or pellets. When using the catalyst in a fixed bed, the cycle of operations mentioned hereinabove is carried out on the catalyst in the reaction zone.

The hydroisomerizing reaction can also be carried out utilizing the catalyst in a fluidized state. In this operation a finely divided catalyst is employed. While the above cycle of operations may in this case also be carried out on the catalyst while the catalyst is in the reaction zone, where regeneration is necessary it is generally preferred to provide a separate regenerator to which catalyst from the reactor may be conveyed either periodically or continuously. The regeneration can be accomplished at about the pressure in the reactor or at about atmospheric pressure. When the regeneration is carried out in a vessel separate from the reactor, the steps of reducing the catalyst with hydrogen and contacting the catalyst with an oxidizing substance should preferably be conducted in a vessel into which the catalyst from the regenerator is introduced. When the acitivity of the hydroisomerizing catalyst in a fixed bed falls below a selected level, the catalyst is then purged with an inert gas to remove occluded hydrocarbons and hydrogen.

The catalyst is then subjected to oxidative regeneration. The regeneration is preferably accomplished by contacting the catalyst with air or a gas containing oxygen to burn off carbonaceous deposits. The regenerated catalyst is then ready for reduction with hydrogen followed by reoxidation with an oxygenic substance.

In order to illustrate the advantageous results obtained when operating in accordance with the invention, n-heptane was hydroisomerized over a catalyst comprising 8.4 weight per cent molybdenum oxide calculated as $MoO_3$ impregnated on a finely divided activated alumina base which contained about 5 per cent silica. The catalyst was reduced at 1050° F. and atmospheric pressure by passing hydrogen at a space velocity of about 830 volumes of hydrogen (measured at standard temperature and pressure) per volume of catalyst per hour through the catalyst for about four hours. The hydrogen pressure was then increased to 100 pounds per square inch gauge and the reduction continued for an additional two hours by passing hydrogen over the catalyst at a space velocity of about 450 volumes of hydrogen (measured at standard temperature and pressure) per volume of catalyst per hour. This reduction resulted in the elimination of about 41 per cent by weight of the oxygen present in the molybdenum trioxide impregnant. The catalyst was then cooled to a reaction temperature in the range 800° to 850° F. in one and one-half hours in a nitrogen stream. When no reoxidation of the catalyst was desired, pure nitrogen was employed. When reoxidation of the catalyst was wanted, nitrogen containing about 0.3 mol per cent oxygen was used. Reoxidation was carried out until the oxygen content of the catalyst constituted about 70 per cent by weight of the oxygen which would have been present if the oxide of molybdenum were molybdenum trioxide. Catalysts which were prereduced with hydrogen are compared with the same catalyst which was not prereduced but instead was treated only with air.

Determination of the exact extent of reduction and reoxidation is quite difficult, so the actual degree of reduction and reoxidation may differ slightly from that indicated above. It is quite certain, however, that the reduction involved transforming the molybdenum trioxide to a gross state of oxidation below that of molybdenum dioxide and the reoxidation involved transforming the reduced oxide to a gross state of oxidation corresponding to that of molybdenum dioxide or slightly higher. The reoxidation was adequate to reoxidize any metal atoms which may have formed.

Hydroisomerization of n-heptane over the molybdenum catalysts prepared as described above was conducted at temperatures between about 800° and about 850° F. at 300 pounds per square inch gauge. The n-heptane was passed through a fixed fluidized bed of the catalyst at a space velocity of two volumes of liquid per volume of packed catalyst per hour. Concurrent to the flow of n-heptane, hydrogen was also introduced into the reactor in an amount corresponding to about 5,500 standard cubic feet of hydrogen per barrel of liquid charge. The reactions were allowed to continue for a throughput of 6. The product for the throughput interval from 3 to 6, inclusive, was collected and examined. The following table of data summarizes the results obtained.

|  | Run No. | Temp., °F. | Yield, Percent by wt. | Research Octane No. |
|---|---|---|---|---|
| Catalyst pretreated with air at 850° to 950° F. | 1 | 822 | 78.0 | 35.0 |
|  | 2 | 826 | 74.7 | 36.9 |
|  | 3 | 845 | 73.6 | 39.5 |
| Catalyst prereduced at 1,050° F. and then treated with pure nitrogen. | 4 | 807 | 87.0 | 19.9 |
|  | 5 | 826 | 79.3 | 29.8 |
|  | 6 | 837 | 73.0 | 33.6 |
| Catalyst prereduced at 1,050° F. and then treated with nitrogen containing 0.3 mol percent of oxygen. | 7 | 822 | 90.7 | 27.8 |
|  | 8 | 841 | 84.3 | 36.6 |
|  | 9 | 848 | 81.9 | 39.0 |
|  | 10 | 844 | 78.9 | 41.5 |

The data in the above table clearly show the improved results which are obtained with a molybdenum oxide catalyst which has been prereduced with hydrogen at 1050° F. and then treated with nitrogen containing 0.3 mol per cent of oxygen. The product obtained from run 4 above contained about 10 per cent by weight of isoheptane. The isoheptane content of the product of run 7 was about 19 per cent by weight. The improved hydroisomerizing activity of the catalyst which was pretreated with hydrogen and then with nitrogen containing 0.3 mol per cent of oxygen is thus readily apparent.

It will be understood that where saturated hydrocarbons are referred to in the appended claims, a single saturated hydrocarbon and a mixture of saturated hydrocarbons with other hydrocarbons are included unless otherwise indicated.

While our invention has been described above with reference to various specific examples and embodiments, it will be understood that the invention is not limited to such examples and embodiments and may be variously practiced within the scope of the appended claims.

We claim:

1. A process for hydroisomerizing saturated hydrocarbons which comprises contacting said hydrocarbons under hydroisomerizing conditions including a temperature of at least 750° F., a pressure of at least about 50 pounds per square inch, and a hydrogen concentration of about 500 to 30,000 standard cubic feet of hydrogen per barrel of said hydrocarbons, with a catalyst comprising an oxide of molybdenum, said catalyst having been pretreated by reduction with hydrogen whereby an oxide of molybdenum is reduced to a gross state of oxidation intermediate the free metal molybdenum and molybdenum dioxide followed by contact of the reduced catalyst with a gas selected from the group consisting of oxygen, steam and carbon dioxide for a time sufficient to convert at least the surface of the reduced catalyst to a higher state of oxidation intermediate the free metal molybdenum and molybdenum trioxide.

2. A process for hydroisomerizing saturated hydrocarbons which comprises contacting said hydrocarbons under hydroisomerizing conditions including a temperature of at least 750° F., a pressure of at least about 50 pounds per square inch, and a hydrogen concentration of about 500 to 30,000 standard cubic feet of hydrogen per barrel of said hydrocarbons, with a catalyst comprising an oxide of molybdenum, said catalyst having been pretreated by reduction with hydrogen at a temperature of about 1000° to 1100° F., whereby an oxide of molybdenum is reduced to a gross state of oxidation intermediate the free metal molybdenum and molybdenum dioxide followed by contact of the reduced catalyst with nitrogen containing about 0.3 mol per cent of oxygen to convert at least the surface of the reduced catalyst to a gross state of oxidation corresponding substantially to molybdenum dioxide.

3. A process for hydroisomerizing saturated hydrocarbons which comprises contacting said hydrocarbons under hydroisomerizing conditions including a temperature of at least 750° F., a pressure of at least about 50 pounds per square inch, and a hydrogen concentration of about 1,000 to 20,000 standard cubic feet of hydrogen per barrel of said hydrocarbons, with a catalyst comprising a pretreated oxide of molybdenum, said catalyst having been pretreated by contacting molybdenum trioxide with hydrogen under reducing conditions whereby the trioxide is reduced to a gross state of oxidation intermediate the free metal molybdenum and molybdenum dioxide, and contacting the reduced catalyst with nitrogen containing about 0.3 mol per cent of oxygen at a temperature of about 750° to about 1100° F. to convert at least the surface of the reduced catalyst to a higher state of oxidation intermediate the free metal molybdenum and molybdenum trioxide.

4. A process for hydroisomerizing n-heptane which comprises contacting said n-heptane at 800° to 850° F., at about 300 pounds per square inch, with about 5,500 standard cubic feet of hydrogen per barrel of said n-heptane in the presence of a catalyst comprising a pretreated oxide of molybdenum deposited on an activated alumina base containing about 5 per cent by weight of silica, said catalyst having been pretreated by contacting molybdenum trioxide with hydrogen at about 1000° to 1100° F. until at least about 40 per cent by weight of the oxygen is eliminated from the molybdenum trioxide, and contacting the reduced catalyst with nitrogen containing about 0.3 mol per cent of oxygen at about 800° to 850° F. until the oxygen content of the finished catalyst constitutes about 70 per cent by weight of oxygen which would be present if the oxide of molybdenum were molybdenum trioxide.

References Cited in the file of this patent

UNITED STATES PATENTS

| | | |
|---|---|---|
| 2,231,202 | Stowe | Feb. 11, 1941 |
| 2,274,988 | Matuszak | Mar. 3, 1942 |
| 2,324,762 | Calhoun et al. | July 20, 1943 |
| 2,424,636 | Smith | July 29, 1947 |